US009874704B2

(12) United States Patent
Amirkiai et al.

(10) Patent No.: US 9,874,704 B2
(45) Date of Patent: Jan. 23, 2018

(54) FERRULE ASSEMBLIES

(71) Applicant: FINISAR CORPORATION, Sunnyvale, CA (US)

(72) Inventors: Maziar Amirkiai, Sunnyvale, CA (US); Hongyu Deng, Saratoga, CA (US); Tao Wu, Union City, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 14 days.

(21) Appl. No.: 14/824,883

(22) Filed: Aug. 12, 2015

(65) Prior Publication Data

US 2016/0047992 A1    Feb. 18, 2016

Related U.S. Application Data

(60) Provisional application No. 62/036,714, filed on Aug. 13, 2014, provisional application No. 62/039,758, (Continued)

(51) Int. Cl.
*G02B 6/42* (2006.01)
*G02B 6/38* (2006.01)
(Continued)

(52) U.S. Cl.
CPC .......... *G02B 6/4212* (2013.01); *G02B 6/423* (2013.01); *G02B 6/4204* (2013.01); *G02B 6/4231* (2013.01); *G02B 6/4246* (2013.01); *G02B 6/4249* (2013.01); *G02B 6/4251* (2013.01); *G02B 6/325* (2013.01); *G02B 6/3636* (2013.01);
(Continued)

(58) Field of Classification Search
None
See application file for complete search history.

(56) References Cited

U.S. PATENT DOCUMENTS 4,801,191 A  *  1/1989  Nakai ................. G02B 6/3839
                                                              385/59
5,315,678 A  *  5/1994  Maekawa ............ G02B 6/3839
                                                              385/59
(Continued)

FOREIGN PATENT DOCUMENTS

JP         2007271882 A        10/2007

OTHER PUBLICATIONS

International Search Report and Written Opinion for PCT Application No. PCT/US2015/057883 dated Dec. 23, 2015.

*Primary Examiner* — Tina Wong
(74) *Attorney, Agent, or Firm* — Maschoff Brennan

(57) ABSTRACT

This disclosure generally relates to high-speed fiber optic networks that use light signals to transmit data over a network. The disclosed subject matter includes devices and methods relating to ferrule assemblies and/or ferrule alignment assemblies. In some aspects, the disclosed devices and methods may relate to a ferrule assembly including: optical fibers, an upper clamp member and a lower clamp member configured to retain the optical fibers that are positioned between the upper and lower clamp members, and a ferrule body surrounding at least a portion of the upper and lower clamp members; and an alignment sleeve including a sleeve cavity configured to receive the ferrule body such that the ferrule assembly is capable of being longitudinally repositioned with respect to the alignment sleeve.

19 Claims, 6 Drawing Sheets

Related U.S. Application Data filed on Aug. 20, 2014, provisional application No. 62/063,225, filed on Oct. 13, 2014, provisional application No. 62/069,707, filed on Oct. 28, 2014, provisional application No. 62/069,710, filed on Oct. 28, 2014, provisional application No. 62/069,712, filed on Oct. 28, 2014.

(51) Int. Cl.
  *G02B 6/32* (2006.01)
  *G02B 6/36* (2006.01)

(52) U.S. Cl.
  CPC .......... *G02B 6/3858* (2013.01); *G02B 6/3861* (2013.01); *G02B 6/3874* (2013.01)

(56) References Cited

U.S. PATENT DOCUMENTS

| | | | | |
|---|---|---|---|---|
| 5,339,376 A | * | 8/1994 | Kakii | G02B 6/3839 385/59 |
| 5,519,798 A | * | 5/1996 | Shahid | G02B 6/3636 385/59 |
| 6,045,270 A | * | 4/2000 | Weiss | G02B 6/3825 385/59 |
| 6,132,105 A | * | 10/2000 | Konda | G02B 6/3885 385/65 |
| 6,464,407 B1 | * | 10/2002 | Ngo | G02B 6/3839 385/83 |
| 6,474,878 B1 | * | 11/2002 | Demangone | G02B 6/3839 385/147 |
| 6,526,204 B1 | * | 2/2003 | Sherrer | G02B 6/30 385/49 |
| 6,859,588 B2 | * | 2/2005 | Kim | G02B 6/30 385/49 |
| 7,806,602 B2 | * | 10/2010 | Deng | G02B 6/4292 385/88 |
| 7,901,145 B2 | * | 3/2011 | Deng | G02B 6/4292 385/53 |
| 2001/0024551 A1 | | 9/2001 | Yonemura et al. | |
| 2001/0051026 A1 | | 12/2001 | Steinberg et al. | |
| 2004/0264884 A1 | | 12/2004 | Liu | |
| 2012/0257859 A1 | * | 10/2012 | Nhep | G02B 6/3887 385/81 |
| 2014/0191427 A1 | * | 7/2014 | Anderson | G02B 6/3843 264/1.25 |
| 2014/0205246 A1 | | 7/2014 | Li et al. | |
| 2016/0047996 A1 | * | 2/2016 | Amirkiai | G02B 6/4212 385/33 |
| 2016/0085035 A1 | * | 3/2016 | Volker | G02B 6/3893 385/60 |
| 2016/0252682 A1 | * | 9/2016 | Watte | G02B 6/3823 |

* cited by examiner

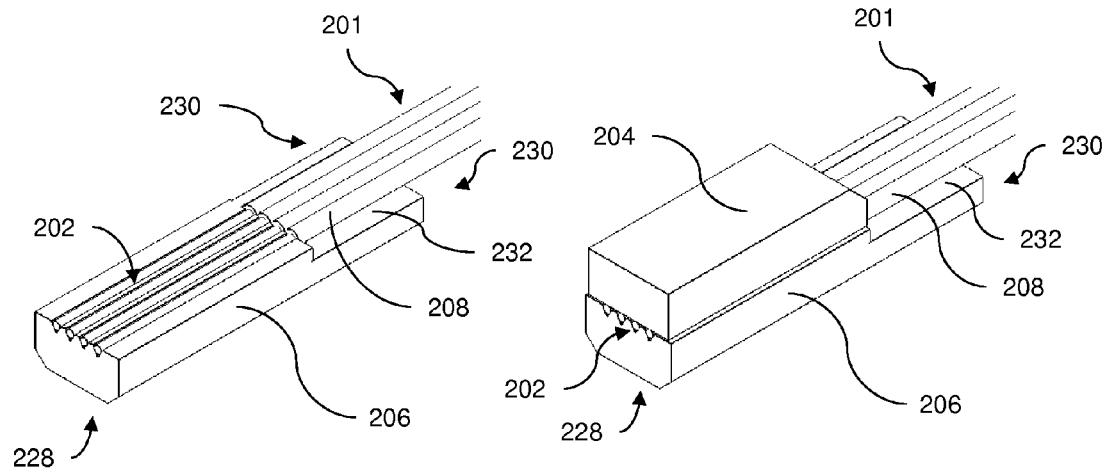
*Fig. 3A*  *Fig. 3B*
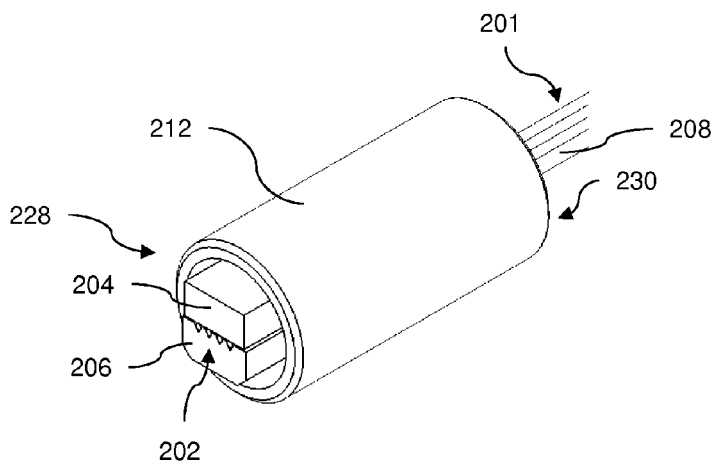
*Fig. 3C*

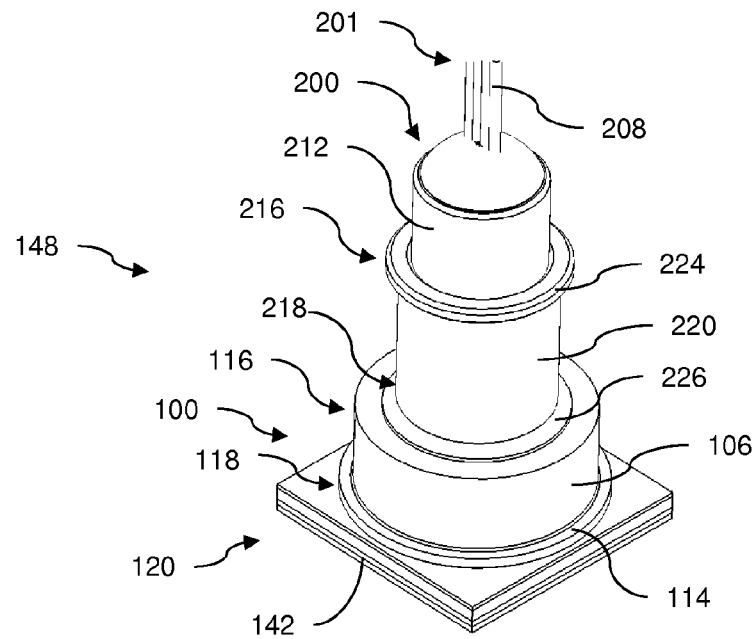
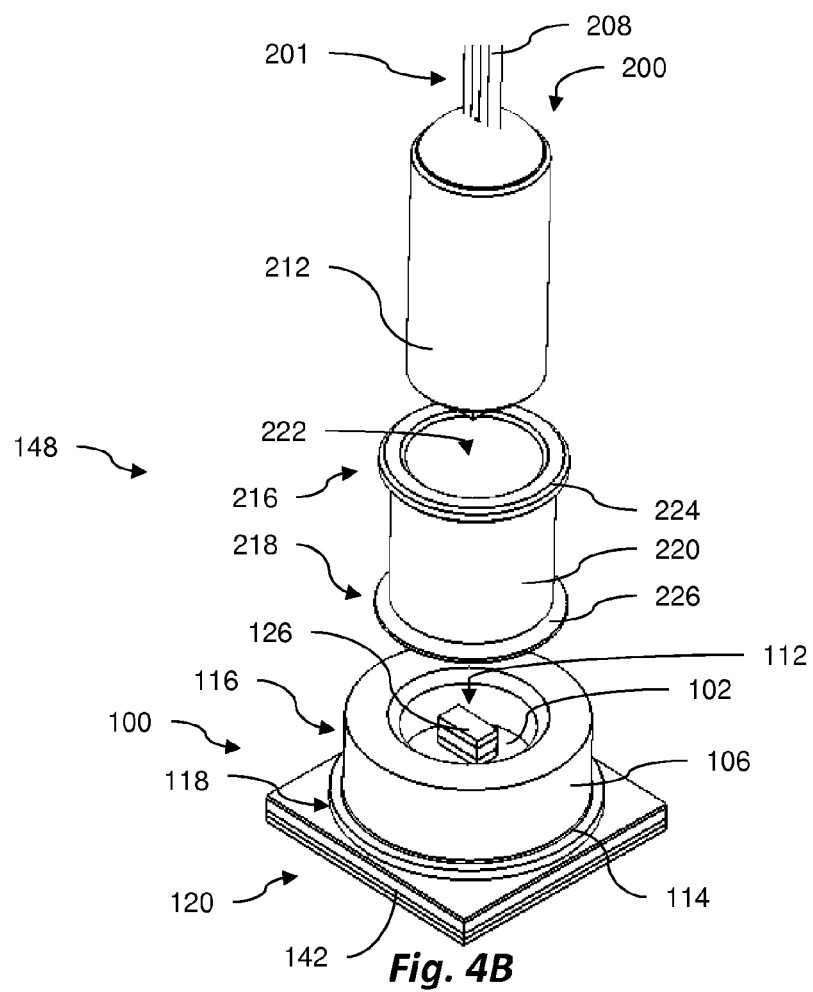

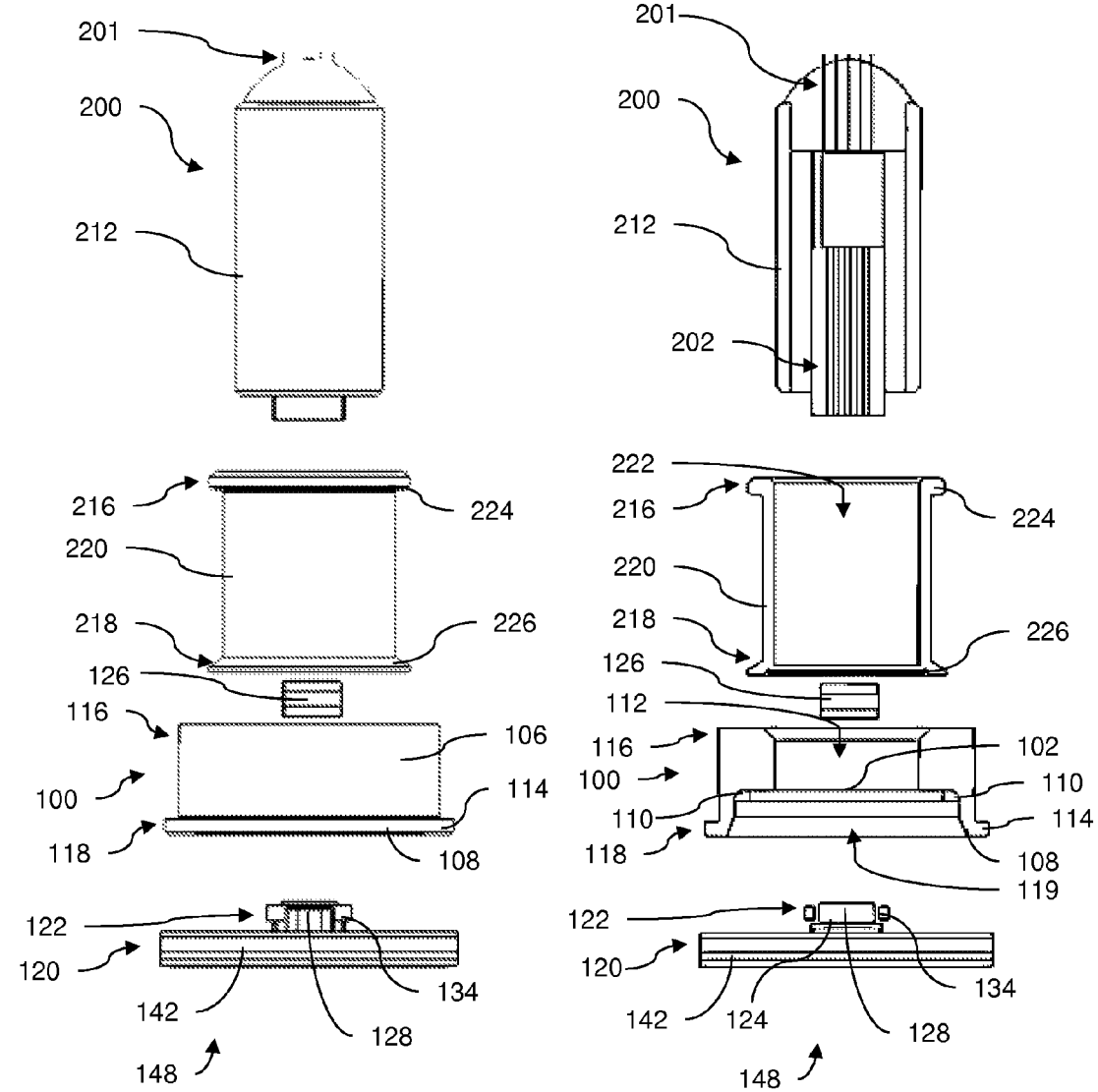

FERRULE ASSEMBLIES

CROSS-REFERENCE TO RELATED APPLICATIONS

This application claims priority to U.S. Provisional Application 62/036,714, filed Aug. 13, 2014, entitled FERRULE ASSEMBLIES; U.S. Provisional Application 62/039,758, filed Aug. 20, 2014 entitled LENS RECEPTACLES; U.S. Provisional Application 62/063,225, filed Oct. 13, 2014, entitled MULTI-LENS OPTICAL COMPONENTS; U.S. Provisional Application 62/069,707 filed Oct. 28, 2014, entitled MULTI-CHANNEL OPTOELECTRONIC SUB-ASSEMBLIES; U.S. Provisional Application 62/069,710 filed Oct. 28, 2014, entitled MULTI-LAYER SUB-STRATES; U.S. Provisional Application 62/069,712 filed Oct. 28, 2014, entitled SUBSTRATES INCLUDING OPTOELECTRONIC COMPONENTS; which are all incorporated by reference herein in their entirety.

BACKGROUND

The present disclosure relates to high-speed fiber optic networks that use light signals to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

The claimed subject matter is not limited to configurations that solve any disadvantages or that operate only in environments such as those described above. This background is only provided to illustrate examples of where the present disclosure may be utilized.

SUMMARY

In one example, a ferrule alignment assembly includes: a ferrule assembly including optical fibers, an upper clamp member and a lower clamp member configured to retain the optical fibers that are positioned between the upper and lower clamp members, and a ferrule body surrounding at least a portion of the upper and lower clamp members; and an alignment sleeve including a sleeve cavity configured to receive the ferrule body such that the ferrule assembly is capable of being longitudinally repositioned with respect to the alignment sleeve.

In another example, a method of assembling an optoelectronic subassembly includes: inserting a ferrule body into a sleeve cavity of an alignment sleeve, the ferrule body including optical fibers, an upper clamp member and a lower clamp member configured to retain the optical fibers that are positioned between the upper and lower clamp members; and fixing the ferrule body with respect to the alignment sleeve in a longitudinal position in the sleeve cavity to form a ferrule assembly.

In yet another example, a method of assembling an optoelectronic subassembly includes: providing an alignment sleeve having a sleeve cavity and a ferrule body having upper and lower clamp members that retain optical fibers; positioning the ferrule body at least partially inside of the sleeve cavity such that the ferrule body is capable of being repositioned along a longitudinal axis of the alignment sleeve; positioning the alignment sleeve on an optical device including a header assembly and one or more optoelectronic components configured to transmit and/or receive optical signals; aligning the ferrule body inside the sleeve cavity with respect to the optoelectronic component to optically couple the optoelectronic component and at least one of the optical fibers; fixing the ferrule body to the alignment sleeve at a longitudinal position to form a ferrule assembly having the alignment sleeve containing the ferrule body; positioning the ferrule assembly so that the optical fibers are optically coupled with the optoelectronic component; and fixing the ferrule assembly to the optical device to retain optical coupling between the optical fibers and the optoelectronic component.

This Summary is provided to introduce a selection of concepts in a simplified form that are further described below in the Detailed Description. This Summary is not intended to identify key features or essential characteristics of the disclosed subject matter, nor is it intended to be used as an aid in determining the scope of the claims. Additional features and advantages will be set forth in the description which follows, and in part will be obvious from the description, or may be learned by practice.

BRIEF DESCRIPTION OF THE DRAWINGS

FIGS. 3A-3C are perspective views of portions of the ferrule assembly of FIG. 1.

FIG. 4A is a perspective view of an optoelectronic subassembly.

FIG. 4B is an exploded perspective view of the optoelectronic subassembly of FIG. 4A.

FIG. 6A is an exploded side view of the optoelectronic subassembly of FIG. 4A.

FIG. 6B is an exploded side cross-sectional view of the optoelectronic subassembly of FIG. 4A.

DETAILED DESCRIPTION

Figure 1:
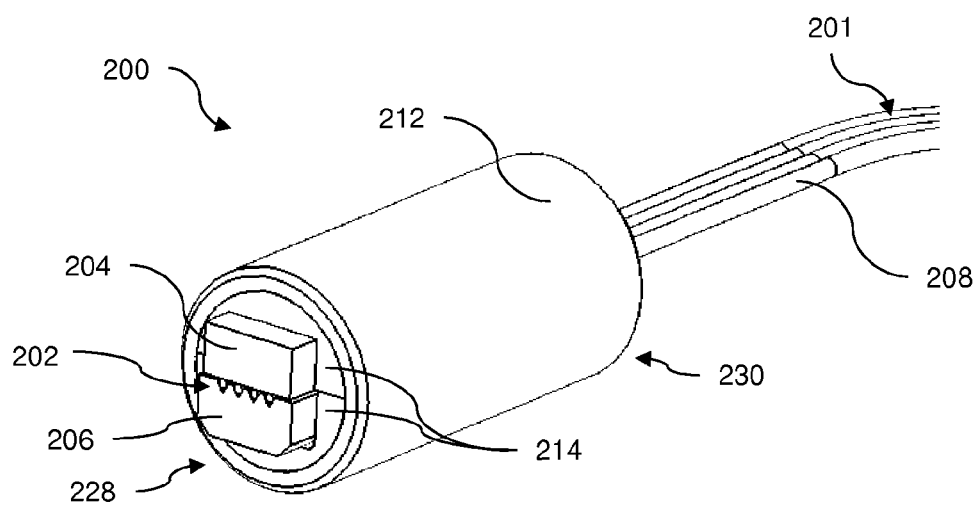
FIG. 1 is a perspective view of a ferrule assembly.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The terms and words used in the following description and claims are not limited to the bibliographical meanings, but are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

In this disclosure the term "optoelectronic subassembly" may be used to refer to any portion of an optoelectronic assembly. However, at times this disclosure may use "optoelectronic subassembly" to refer to specific portions of an optoelectronic assembly, as may be indicated by context.

High-speed fiber optic networks use light signals (which may also be referred to as optical signals) to transmit data over a network. Although fiber optic networks use light signals to carry data, many electronic devices such as computers and other network devices use electrical signals. Accordingly, optoelectronic assemblies may be used to convert electrical signals to optical signals, convert optical signals to electrical signals, or convert both electrical signals to optical signals and optical signals to electrical signals.

Optoelectronic assemblies may include optoelectronic subassemblies ("OSAs"), such as receiver optoelectronic subassemblies ("ROSAs"), transmitter optoelectronic subassemblies ("TOSAs"), or both. A ROSA receives light signals with a light detector such as a photodiode and converts light signals into electrical signals. A TOSA receives electrical signals and transmits corresponding light signals. A TOSA may include an optical transmitter such as a laser that generates light that is transmitted through a fiber optic network.

Optoelectronic assemblies or subassemblies may include various components such as optical components and/or electronic components. Optical components involve optical signals and may, for example, emit, receive, transmit, carry, focus, and/or collimate optical signals. Electrical components involve electrical signals may, for example, receive, transmit, carry, transduce, transform, modulate, and/or amplify electronic signals. Optoelectronic components may involve both electrical and optical signals, and may be referred to as transducer components. Optoelectronic components may change optical signals to electrical signals and/or change electrical signals to optical signals (e.g., diodes or lasers).

Some optoelectronic assemblies may include multiple channels ("multi-channel optoelectronic assemblies"), with each channel corresponding to a set of one or more optical signals travelling through an optical fiber. Multi-channel optoelectronic assemblies may support increased data transfer rates through fiber optic networks. For example, a four channel optoelectronic assembly may be able to send and receive data at data transfer rates of approximately four times the data transfer rate of a comparable single channel optoelectronic assembly.

Ferrule assemblies may be used in fiber optic networks to physically and/or optically couple optical fibers with optoelectronic assemblies, optoelectronic subassemblies, optical components and/or electronic components. For example, ferrule assemblies may be used to couple ROSAs and/or TOSAs to optical fibers that are part of a fiber optic network thereby permitting the ROSA to receive optical signals and/or permitting the TOSA to transmit optical signals. Additionally or alternatively, ferrule assemblies may form part of an optoelectronic assembly or subassembly configured to transmit or receive electrical or optical signals in a fiber optic network.

Optoelectronic assemblies may need to comply with certain standards that may specify aspects of optoelectronic assemblies such as size, power handling, component interfaces, operating wavelengths or other specifications. Examples of such standards include CFP, XAUI, QSFP, QSFP+, XFP, SFP and GBIC. Complying with such standards may limit the structure, size, cost, performance or other aspects of optoelectronic assembly designs. Such standards may also limit configurations of ferrule assemblies.

Components such as optoelectronic subassemblies or portions of optoelectronic subassemblies may be produced in large quantities and the produced components may need to comply with specifications that specify various aspects of the produced components (e.g., shape, dimensions and/or positioning). The produced components may include variations in the specifications. Some variation in specifications may be permitted because the produced components may be suitable or work properly. Some variations in specifications may result in components that are unsuitable. Tolerance may refer to an allowable amount of variation of a specification (e.g., dimension or positioning). Some specifications may have higher ("wider") or lower ("tighter") tolerance. For example, outside dimensions of optoelectronic subassemblies may have a wider tolerance because the variations may not affect the operation of the produced optoelectronic subassemblies. In another example, the positioning of optical components may require a tighter tolerance because the positioning affects the focus and/or transmission of optical signals.

The selected production processes may affect the prevalence and extent of the variations. In some circumstances the production processes may be controlled to increase or decrease the range of variation, the frequency of the variations, or other aspects. In some circumstances, producing components to tighter tolerances may increase production costs (or vice versa). For example, the tighter tolerance production processes may be more expensive than wider tolerance production processes. Tighter tolerance may result in more unsuitable components. Unsuitable components may be discarded without recovering production costs or repaired adding to production costs. Production processes may be modified to decrease or eliminate the production of unsuitable components, but in some circumstances this may increase costs.

FIGS. 1-2, 3A-3C, 4A-4B, 5A-5B and 6A-6B illustrate aspects of a ferrule assembly 200 configured to couple optical fibers 202 in optoelectronic subassemblies such as an optoelectronic subassembly 148. In some configurations, the ferrule assembly 200 may interface with a multi-lens optical component 100 and/or a header subassembly 120. Each optical fiber 202 may correspond to one channel of a multi-channel optoelectronic subassembly. Certain aspects of the ferrule assembly 200, which will be described in further detail below, may facilitate economical production of multi-channel optoelectronic subassemblies. For example, some aspects of the ferrule assembly 200 may simplify the alignment and/or assembly processes involving multi-channel optoelectronic subassemblies. Additionally or alternatively, aspects of the ferrule assembly 200 may decrease the costs of the materials used to produce the ferrule assembly 200 and/or optoelectronic subassemblies incorporating the ferrule assembly 200.

Figure 2:
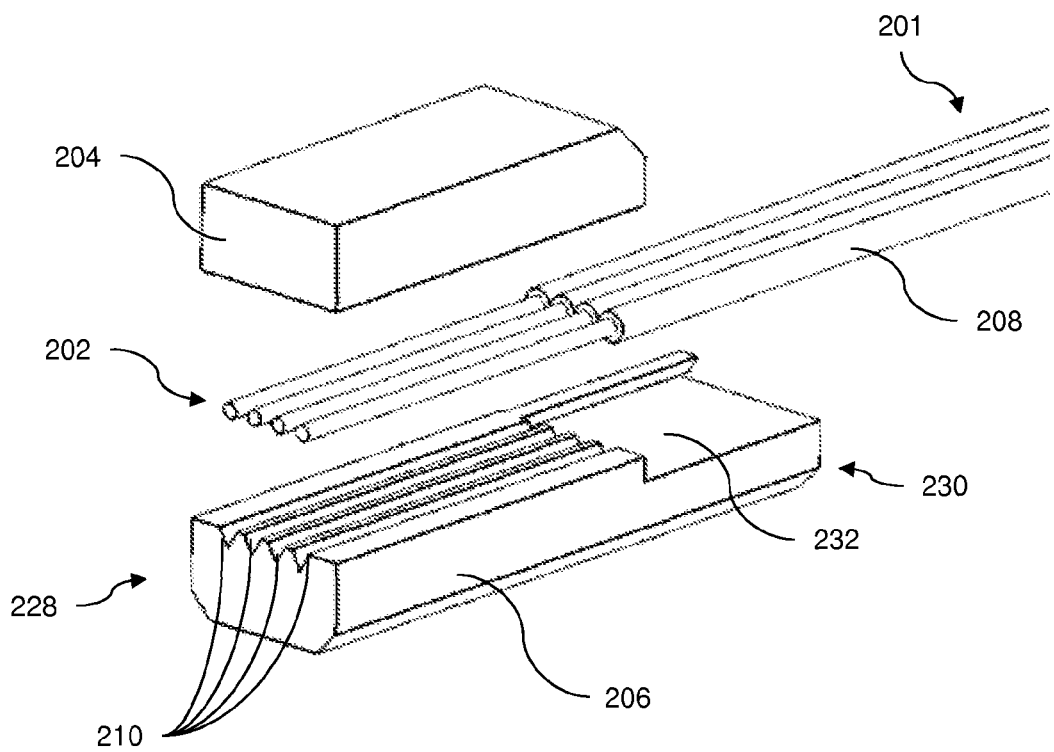
FIG. 2 is an exploded perspective view of a portion of the ferrule assembly of FIG. 1.

Turning to FIGS. 1 and 2, for example, the ferrule assembly 200 may include an upper portion such as an upper clamp member 204 configured to couple with the optical fibers 202 and a lower portion such as a lower clamp member 206 configured to couple with the optical fibers 202 and the upper clamp member 204. The upper and lower clamp members 204, 206 may be configured to retain the optical fibers 202 of corresponding optical cables 201 (which may be a single optical cable or a plurality of optical cables, such as ribbon optical cables) positioned between the upper and lower clamp members 204, 206. Accordingly, the upper and lower clamp members 204, 206 may cooperate to couple the optical fibers 202 between one another. In some aspects, the upper and lower clamp members 204, 206 may form a single integrally formed clamp member.

The optical cables 201 may include casings 208 surrounding at least a portion of the optical fibers 202. The casings 208 may be configured to insulate and/or guard the optical fibers 202. As illustrated, at least one or all of the optical fibers 202 may include a corresponding casing 208. Additionally or alternatively, one of the casings 208 may surround more than one of the optical fibers 202 and/or may surround all of the optical fibers 202. As illustrated, a portion of the optical fibers 202 are exposed from the casings 208 of the optical cables 201, and the optical fibers 202 are retained between the upper and lower clamp members 204, 206. In other examples, the upper and lower clamp members 204, 206 may retain the optical cables 201 by contacting the casings 208. The upper and lower clamp members 204, 206 may have various configurations and features that provide for a mechanism to clamp together with the optical fibers 202 held between.

A ferrule body 212 may surround at least a portion of the upper and lower clamp members 204, 206 and/or the optical fibers 202. The ferrule body 212 may be configured to hold the upper and lower clamp members 204, 206 together to clamp the optical fibers 202 between the upper and lower clamp members 204, 206. A potting material 214 may be positioned within the ferrule body 212 and around the upper and lower clamp members 204, 206 so that the potting material 214 fills gaps between the ferrule body 212 and the upper and lower clamp members 204, 206 to hold the ferrule assembly 200 together and retain the optical fibers 202 clamped between the upper and lower clamp members 204, 206 within the ferrule body 212. In some aspects, all of the ferrule body 212, the upper and lower clamp members 204, 206 and the potting material 214 may contribute to holding the ferrule assembly 200 together and/or retaining the optical fibers 202.

In one aspect, the potting material 214 may be a single material or formed from two separate materials, with one material for the bottom and one material for the top. In one aspect, the potting material 214 may be a portion of or integrated with the ferrule body 212. In one aspect, the potting material 214 may be part of one or both of the upper and lower clamp members 204, 206, such that they have a round cross-sectional profile once clamped together to fit (e.g., friction fit) in the round lumen of the ferrule body 212.

As illustrated, in some configurations the ferrule body 212 may be annular or cylindrical. In other configurations, the ferrule body 212 may be any suitable configuration including rectangular, polygonal, multi-faceted, curved or a combination thereof. The potting material 214 and the upper and lower clamp members 204, 206 may also have various shapes that may fit within the ferrule body 212. Accordingly, the shapes and dimensions of the elements of the ferrule assembly 200 may be varied.

FIGS. 2 and 3A-3C illustrate various views of portions of the ferrule assembly 200. As illustrated, for example, in FIG. 2, the lower clamp member 206 of the ferrule assembly 200 may include troughs 210. Each of the troughs 210 may be configured (e.g., shaped and/or dimensioned) to receive or house a portion of a corresponding optical fiber 202. The troughs 210 may include any suitable configuration, including u-shaped, c-shaped, semicircular, square, tapered or any other shape. As illustrated, in some examples, each of the troughs 210 may be substantially v-shaped. The troughs 210 may be longitudinally oriented and extend from a front end 228 toward a back end 230. As illustrated, the troughs 210 may terminate at a shelf 232 of the lower clamp member 206 at the back end 230. Correspondingly, the upper clamp member 204 may be dimensioned to extend over the troughs 210 from the front end 228 to the shelf 232 or the back end 230 of the ferrule assembly 200. In other examples, the shelf 232 may not be included and the troughs 210 make extend the entire length of the upper clamp member 204 and/or lower clamp member 206. In another example, the upper clamp member 204 may include a corresponding shelf opposite of the shelf 232. In some configurations, both the upper and the lower clamp members 204, 206 may be devoid of the shelf. The length of the troughs 210 may correspond with the length of the exposed optical fiber 202 such that the shelf 232 receives the casings 208.

FIG. 3A illustrates the optical fibers 202 positioned at least partially inside of the troughs 210 of the lower clamp member 206. Portions of the optical fibers 202 that are positioned within the troughs 210 may or may not include the casings 208. The casings 208 may be retained in the shelf 232. The lower clamp member 206 may be formed of any suitable material, for example, glass or plastic polymer. The lower clamp member 206 may be formed by molding, machining, stamping, printing or any suitable technique. The troughs 210 may be formed integrally with the lower clamp member 206. Alternatively, the troughs 210 may be formed on the lower clamp member 206 by machining, stamping, removal, etching, or any suitable technique. The shelf 232 may be similarly formed as the troughs 210. FIG. 3A may also represent an example of the upper clamp member 204.

As illustrated, the ferrule assembly 200 may be configured to retain the optical fibers 202 in a linear configuration. Specifically, each of the troughs 210 may be positioned on a common plane to retain the optical fibers 202 parallel to one another such that the ends of the optical fibers 202 are linearly positioned. In alternative configurations, the troughs 210 may not be positioned on a common plane and/or may not retain the optical fibers 202 in a linear and/or parallel configuration. For example, the troughs 210 may retain the optical fibers 202 in a square, rectangular, circular or any other suitable configuration. The configuration of the optical fibers 202 may correspond to configurations of the multi-lens optical component 100, the header subassembly 120 and/or other components.

The troughs 210 may facilitate production of the ferrule assembly 200. For example, the troughs 210 may contribute in retaining the optical fibers 202 during production. The troughs 210 may facilitate aligning the optical fibers 202. Specifically, the troughs 210 may facilitate producing the ferrule assembly 200 so the optical fibers 202 are positioned specific distances from one another. Additionally or alternatively, the troughs 210 may facilitate producing the ferrule assembly 200 so the optical fibers 202 are arranged in a suitable configuration, such as the linear configuration illustrated in the figures.

FIG. 3B illustrates the optical fibers 202 positioned between the upper and lower clamp members 204, 206. The upper and/or lower clamp members 204, 206 may be formed of any suitable material, for example, glass or plastic polymer. In some configurations, the upper and/or lower clamp members 204, 206 may be formed by molding, machining, stamping, printing or any suitable technique.

In alternative configurations, troughs may be positioned on the upper clamp member 204 and may include some or all aspects of the troughs 210. The troughs in the upper clamp member 204 may be included in addition to or instead of the troughs 210 in the lower clamp member 206. In configurations that include troughs in the upper and lower clamp members 204, 206, both may contribute housing, retaining and/or aligning the optical fibers 202. A shelf may also be positioned on the upper clamp member 204 and may include some or all aspects of the shelf 232.

In one aspect, the upper clamp member 204 may be configured, shaped, and/or dimensioned as shown to correspond to the lower clamp member 206, or vice versa, or both may be configured, shaped, and/or dimensioned to correspond to the lower clamp member 206. The upper clamp member 204 and the lower clamp member 206 may be coupled to one another by fusing, bonding, soldering, adhesive or any other suitable technique. Alternatively, the upper clamp member 204 may be formed on the lower clamp member 206, encasing and/or retaining a portion of the optical fibers 202. For example, the optical fibers 202 may be positioned within the troughs 210 and viscous glass or plastic polymer may be positioned over the lower clamp member 206 and the optical fibers 202. The viscous glass or plastic polymer may then solidify forming the upper clamp member 204. In some aspects, viscous glass or plastic polymer may be injected into a lumen of the ferrule body 212 to form the upper clamp member 204 over the lower clamp member 206 and a portion of the optical fibers 202.

FIG. 3C illustrates the ferrule assembly 200 without the potting material 214. FIG. 1 illustrates the ferrule assembly 200 including the potting material 214. The potting material 214 may provide support for the ferrule assembly 200. For example, the potting material 214 may form a structure coupling the upper and lower clamp members 204, 206 to the ferrule body 212. The potting material 214 may contribute to retaining the upper and lower clamp members 204, 206 in contact with one another and to provide the clamp function onto the optical fibers 202. Additionally or alternatively, the potting material 214 may contribute in retaining the optical fibers 202 between the upper and lower clamp members 204, 206. In some configurations, the potting material 214 may be omitted and the upper clamp member 204 and/or the lower clamp member 206 may substantially fill the ferrule body 212.

In some configurations, both the upper and lower clamp members 204, 206 may be formed together around the optical fibers 202. For example, the optical fibers 202 may be positioned within the ferrule body 212 and viscous glass or plastic polymer may be injected into the ferrule body 212. The viscous glass or plastic polymer may then solidify and integrally form both the lower clamp member 206 and the upper clamp member 204 around a portion of the optical fibers 202. In such configurations, the ferrule assembly 200 may not include the troughs 210 to facilitate positioning or aligning the optical fibers 202. Alternatively, the troughs 210 may be formed around the optical fibers 202 during manufacture of the upper and/or lower clamp members 204, 206. The troughs 210 may be formed as conduits when the upper and lower clamp members 204, 206 are integrated with each other.

In other configurations, all of the upper and lower clamp members 204, 206 and the ferrule body 212 may be integrally formed together around the optical fibers 202. For example, viscous glass or plastic polymer may be positioned around the optical fibers 202 and solidify to integrally form the upper and lower clamp members 204, 206 as well as the ferrule body 212. In such configurations, the ferrule assembly 200 may not include the potting material 214. In such examples, the upper and lower clamp members 204, 206 and the ferrule body 212 may be a single integrally formed member. The upper and lower clamp members 204, 206 and the ferrule body 212 may be integrally formed by any suitable method, for example molding.

FIGS. 4A-4B, 5A-5B, and 6A-6B illustrate various views of the optoelectronic subassembly 148 incorporating the ferrule assembly 200 that is configured to interface with the multi-lens optical component 100 and/or the header subassembly 120. The header subassembly 120 may include any suitable aspects of U.S. Provisional Application 62/069,710 filed Oct. 28, 2014, entitled MULTI-LAYER SUBSTRATES and/or U.S. Provisional Application 62/069,712 filed Oct. 28, 2014, entitled SUBSTRATES INCLUDING OPTOELECTRONIC COMPONENTS, which are both incorporated by reference in their entirety.

The header subassembly 120 may include a multilayer substrate 142 and optoelectronic components 122 coupled to or formed on the multilayer substrate 142. The optoelectronic components 122 may include any suitable components that may be used in optoelectronic subassemblies such as TOSAs, ROSAs and/or other optoelectronic subassemblies. The optoelectronic components 122 may include drivers, monitor photodiodes, integrated circuits, inductors, capacitors, receivers, receiver arrays, control circuitry, lenses, laser arrays, or any suitable optoelectronic components. Although not illustrated, electrical lines may couple any of the optoelectronic components 122 to one another and/or to other components. In some configurations, the header subassembly 120 may include contact pads that permit electrical power and/or control signals to be conveyed to the optoelectronic components 122 or other components via the electrical lines. Additionally or alternatively, some of the optoelectronic components 122 may be optically coupled to one other.

The optoelectronic components 122 may include a lens 128 retained by a lens coupling 134. As illustrated, if the header subassembly 120 is part of a TOSA, the optoelectronic components 122 may include a laser array 124 and the lens 128 may be configured to convey, direct and/or focus optical signals from the laser array 124. In another example, if the header subassembly 120 is part of a ROSA, the optoelectronic components 122 may include a receiver array and the lens 128 may be configured to convey, direct and/or focus optical signals to the receiver array.

The header subassembly 120 may be a multi-channel header subassembly and the optoelectronic components 122 may be configured to transmit, receive, direct, convey and/or focus multiple optical signals, each corresponding to one channel. If the header subassembly 120 is a multi-channel transmitter subassembly, the laser array 124 may be a multi-channel laser array configured to transmit multiple optical signals to corresponding optical fibers 202. In some configurations, the laser array 124 may be configured to transmit optical signals to four corresponding optical fibers 202, although other configurations are contemplated. If the header subassembly 120 is a multi-channel receiver subassembly, the receiver array may be a multi-channel receiver array configured to receive multiple optical signals from corresponding optical fibers. In some configurations, the receiver array may be configured to receive optical signals from four corresponding optical fibers, although other configurations are contemplated.

The multi-lens optical component 100 may include any suitable aspects of U.S. Provisional Application 62/063,225, filed Oct. 13, 2014, entitled MULTI-LENS OPTICAL COMPONENTS, which is incorporated by reference in its entirety.

The multi-lens optical component 100 may include a housing 106 extending between a housing top 116 and a housing bottom 118. The housing top 116 and the housing bottom 118 generally refer to portions of the multi-lens optical component 100 and are not limited to portions at or near the ends of the multi-lens optical component 100. The multi-lens optical component 100 may include a window 102 with a lens array 104 of lenses 103 (only one of which is labeled in the Figures for clarity). Each lens 103 may be configured to convey, direct and/or focus light signals travelling between optoelectronic components such as header subassemblies and/or ferrule assemblies. Each lens 103 may be configured to convey, direct and/or focus light signals corresponding to one channel of a multi-channel header subassembly. The multi-lens optical component 100 may include a window seal 110 that contributes to providing a hermetic seal between the housing 106 and the window 102. The housing 106, the window 102 and/or the window seal 110 may define a cavity 119. In some configurations, the cavity 119 may hermetically seal portions of the header subassembly 120 when coupled to the header subassembly 120 and thus may be referred to as a hermetically sealed cavity 119.

The multi-lens optical component 100 may include an aperture 112 defined by the housing 106 and/or the window 102. The aperture 112 may be configured (e.g., shaped and/or dimensioned) to permit light signals to travel through at least a portion of the multi-lens optical component 100 to the window 102. In some configurations, the aperture 112 may receive or house at least a portion of additional optical components within the aperture 112. For example, as illustrated in FIGS. 5B and 6B, the aperture 112 may receive an optical component 126 that may be an isolator or other component that relates to light signals.

The window 102 may be optically transmissive and may be integral to the housing 106 or coupled to the housing 106. The lens array 104 may be positioned on the window 102, at or near the housing bottom 118 and/or within the cavity 119. The lenses 103 of the multi-lens optical component 100 may be optically transmissive convex surfaces configured to convey, direct and/or focus optical signals. The lenses 103 may be coupled with or integral to the window 102. All or some of the lenses 103 may be configured (e.g., shaped, dimensioned and/or positioned) to convey, direct and/or focus optical signals corresponding to one channel of a multi-channel subassembly, such as the header subassembly 120.

The multi-lens optical component 100 may include a housing flange 114 positioned on the housing bottom 118. The housing flange 114 may include a flange base 108 that may be configured (e.g., shaped and/or dimensioned) such that the multi-lens optical component 100 may be coupled to other components, such as header assemblies. The housing top 116 may be configured (e.g., shaped and/or dimensioned) to interface with ferrule assemblies.

As illustrated, for example, in FIGS. 4A-4B, the housing 106 may be substantially circular or annular, although the housing 106 may be any suitable configurations including rectangular, oval, multifaceted and other configurations. The window seal 110 (e.g., FIG. 5B) may be substantially annular and positioned between the window 102 and the housing 106. In other configurations, the window seal 110 may not be annular. For example, in configurations where the housing 106 is rectangular, the window seal 110 may also include a corresponding rectangular configuration.

In addition to or instead of contributing to providing a hermetic seal, the window seal 110 may contribute to coupling the window 102 to the housing 106. For example, for configurations where a hermetic seal is not desired or required, the window seal 110 may couple the window 102 to the housing 106 and may not contribute to providing a hermetic seal. In other configurations, the window seal 110 may both contribute in coupling the window 102 to the housing 106 as well as contribute to providing a hermetic seal.

In some configurations, the window seal 110 may not be positioned substantially between the window 102 and the housing 106. For example, the window 102 and the housing 106 may be coupled to one another at interfaces and the window seal 110 may cover some or all of the interfaces between the window 102 and the housing 106 to contribute to providing a hermetic seal. In such configurations, the window seal 110 may seal any spaces located at some or all of the interfaces.

Certain aspects of the multi-lens optical component 100 may facilitate economical production of optoelectronic subassemblies with multiple channels. Aspects of the multi-lens optical component 100 may contribute to decreased production costs for optoelectronic subassemblies that incorporate the multi-lens optical component 100. For example, some aspects of the multi-lens optical component 100 may simplify the production processes involving optoelectronic subassemblies. In another example, some aspects of the multi-lens optical component 100 may decrease the costs of the materials used to produce the multi-lens optical component 100 and/or optoelectronic subassemblies. In yet another example, some aspects of the multi-lens optical component 100 may decrease the necessary size of the hermetically sealed portions of optoelectronic subassemblies. Additionally or alternatively, aspects of the multi-lens optical component 100 may decrease the size or clearance of optoelectronic subassemblies incorporating the multi-lens optical component 100.

The window 102 and the lenses 103 may be integrally formed by molding, machining, stamping, deposition or other suitable process. In some circumstances, integrally molding the lenses 103 and the window 102 from glass (or plastic polymer) may contribute to cost-effective production of the multi-lens optical component 100. If the lenses 103 are not integrally formed with the window 102, they may be individually formed by molding, machining, stamping, deposition, any other suitable process or combination of such processes. Then, the lenses 103 may be coupled to the window 102 by fusing, soldering, adhesive, or by any other suitable coupling technique. Alternatively, if the lenses 103 are not integrally formed with the window 102, they may be formed on the window 102 by deposition, printing, machining or other suitable process.

As illustrated, the ferrule assembly 200 may include an alignment sleeve 220 configured to facilitate alignment of the ferrule assembly 200. The alignment sleeve 220 may include a cylindrical body extending between a sleeve top 216 and a sleeve bottom 218 and defining a sleeve cavity 222. The sleeve cavity 222 may include a configuration (e.g., shape and/or dimension) corresponding to the ferrule body 212 to receive the ferrule body 212.

If the ferrule body 212 is cylindrical, as illustrated, the sleeve cavity 222 may include a diameter corresponding to a diameter of the ferrule body 212 so the ferrule body 212 may be positioned at least partially inside of the alignment sleeve 220. For example, the diameter of the sleeve cavity 222 may be about the same or slightly greater than the diameter of the ferrule body 212. Such configurations may permit the ferrule assembly 200 to be repositioned in a longitudinal and/or rotational direction along a longitudinal axis with respect to the alignment sleeve 220. It should be understood that throughout this disclosure, "the longitudinal direction" may refer to movement in either direction along the longitudinal axis or both directions along the longitudinal axis, such as relative to the sleeve top 216 and sleeve bottom 218. Repositioning the ferrule assembly 200 along the longitudinal axis may permit the optical fibers 202 to be optically aligned with the multi-lens optical component 100 and/or the header subassembly 120. This configuration may also limit the range of motion of the ferrule assembly 200 such that it may not be repositioned along axes transverse to the longitudinal axis with respect to the alignment sleeve 220. Limiting the range of motion of the ferrule assembly 200 along the transverse axes may facilitate its alignment. For example, limiting the range of motion may simplify and/or decrease the costs of aligning the ferrule assembly 200 with the multi-lens optical component 100 and/or the header subassembly 120. Once the longitudinal alignment is obtained, the ferrule body 212 may be fixed in the set position at a longitudinal position. Then the optical fibers 202 are in a set longitudinal position relative to the lasers and/or photodiodes. Setting the longitudinal position then allows for rotational alignment of the fibers with the lasers and/or photodiodes without changing the longitudinal position, which significantly improves the ease and repeatability of fiber alignment.

In alternative configurations, the ferrule body 212 and the alignment sleeve 220 may not be cylindrical. For example, the ferrule body 212 and the alignment sleeve 220 may include rectangular configurations. In configurations where both the ferrule body 212 and the alignment sleeve 220 are cylindrical, the ferrule assembly 200 may be rotated with respect to the alignment sleeve 220. In rectangular configurations, the ferrule assembly 200 and the alignment sleeve 220 may not be rotated with respect to one another.

In one example, the ferrule body 212 may be repositioned along the longitudinal axis until at least one channel of optical signals travelling between the optical fibers 202, the multi-lens optical component 100, and/or the header subassembly 120 are optically aligned. The ferrule body 212 may be fixed to the alignment sleeve 220, which sets a longitudinal position of the ends of the optical fibers relative to the laser and/or photodiodes. For example, the ferrule body 212 may be coupled to the alignment sleeve 220 by soldering, welding, laser welding, fusing, adhesive, mechanical fastening or any other suitable technique. The ferrule body 212 and the alignment sleeve 220 may be fixed to one another once the ferrule assembly 200 is aligned in a longitudinal direction (that may be parallel to the longitudinal axis) with the multi-lens optical component 100 and/or the header subassembly 120. The alignment sleeve 220 may include an upper sleeve flange 224 positioned on the sleeve top 216 and/or a lower sleeve flange 226 positioned on the sleeve bottom 218. The sleeve bottom 218 of the alignment sleeve 220 may be configured (e.g., shaped and/or dimensioned) to interface with the multi-lens optical component 100.

Figure 5A:
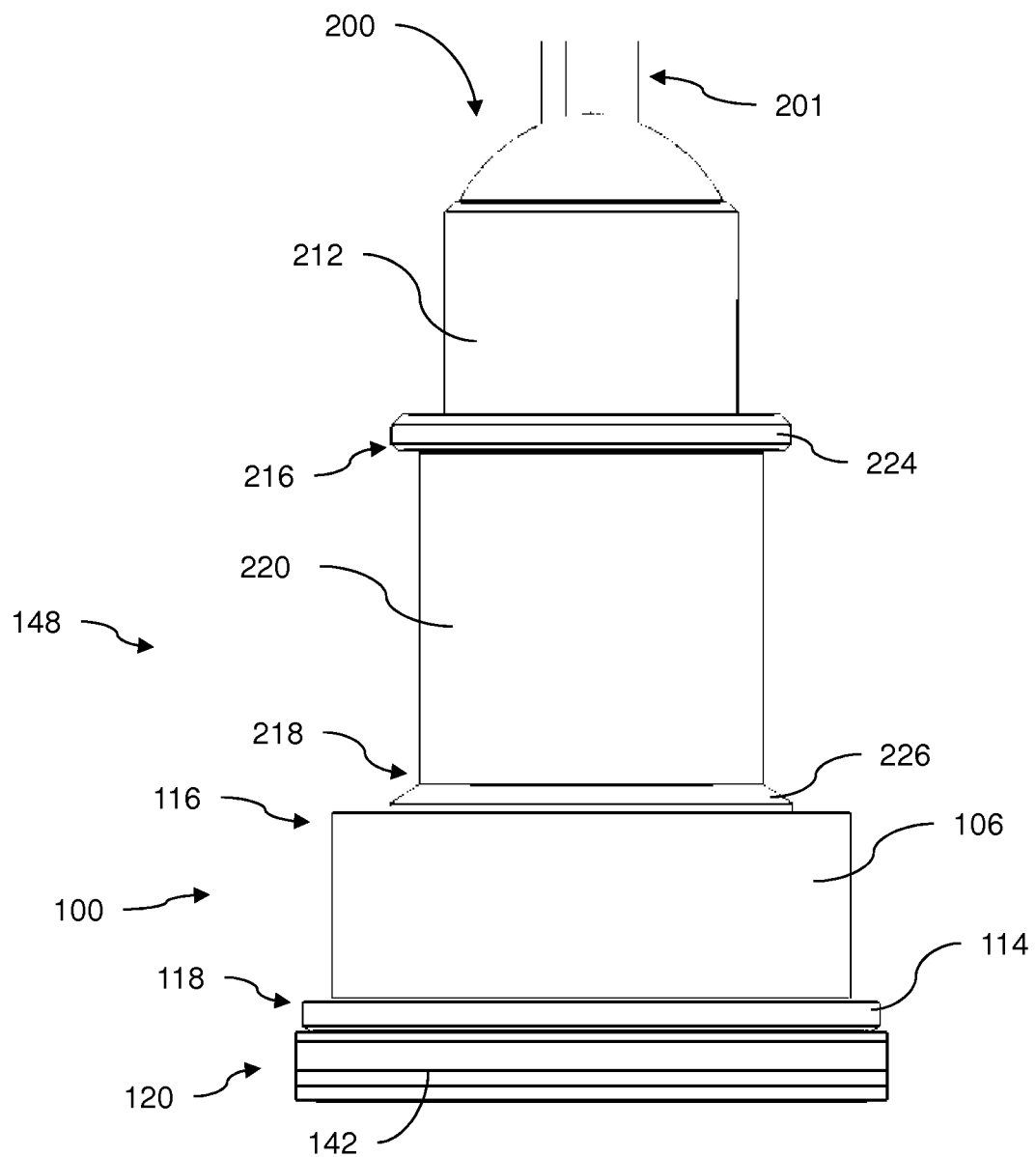
FIG. 5A is a side view of the optoelectronic subassembly of FIG. 4A.
Figure 5B:
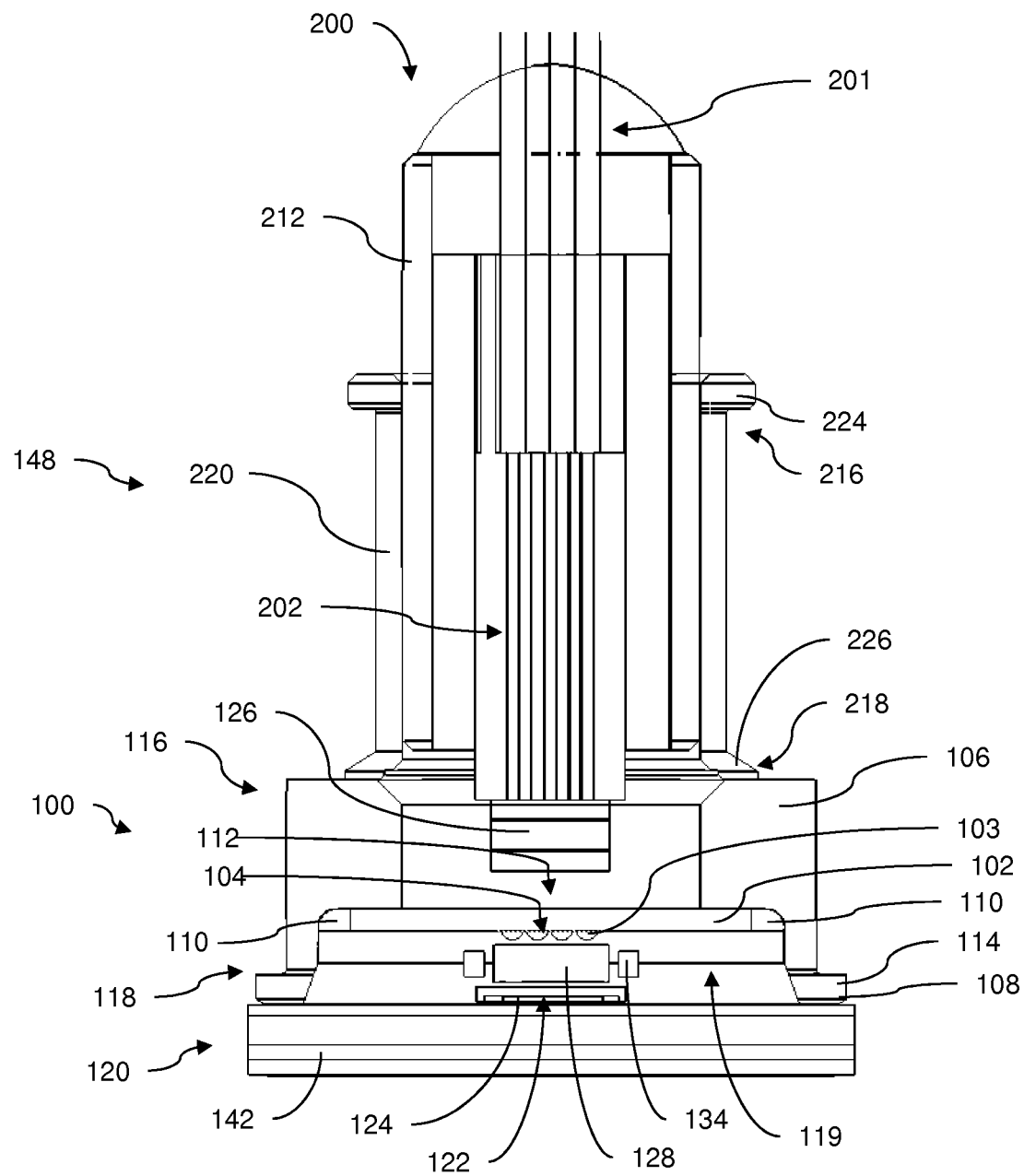
FIG. 5B is a side cross-sectional view of a portion of the optoelectronic subassembly of FIG. 4A.

As illustrated, for example, in FIGS. 5A and 5B, the lower sleeve flange 226 and/or the sleeve bottom 218 may be positioned against the housing top 116 thereby preventing the alignment sleeve 220 from being inserted into the aperture 112. In such configurations, a portion of the ferrule assembly 200 may be positioned in the aperture 112. In alternative configurations, the alignment sleeve 220 may be configured to be partially inserted into the aperture 112 and the lower sleeve flange 226 and/or the sleeve bottom 218 may prevent the alignment sleeve 220 from being inserted further into the aperture 112.

As illustrated, for example, in FIGS. 4A and 4B, both the alignment sleeve 220 and the housing top 116 of the multi-lens optical component 100 may include cylindrical configurations. In alternative configurations, the alignment sleeve 220 and/or the housing top 116 may not be cylindrical. For example, the ferrule body 212 and the alignment sleeve 220 may include rectangular configurations. As illustrated, for example, in FIG. 4A, the ferrule body 212 may be fixed to the alignment sleeve 220 and may be rotated with respect to the multi-lens optical component 100. In other configurations, the configuration of the alignment sleeve 220 and/or the housing top 116 may prevent the ferrule body 212 that is fixed to the alignment sleeve 220 from being rotated with respect to the multi-lens optical component 100.

Rotating the ferrule body 212 may permit the optical fibers 202 to be optically aligned with the multi-lens optical component 100 and/or the header subassembly 120. The ferrule body 212 may be rotated, for example, by rotating the alignment sleeve 220 when the ferrule body 212 is fixed in a longitudinal position within the alignment sleeve 220. For example, if the optical fibers 202 include a linear configuration as illustrated or other suitable configuration, the ferrule body 212 may be rotated until the optical fibers 202 are optically aligned with corresponding linear configurations of the multi-lens optical component 100 and/or the header subassembly 120. Once the optical fibers 202 are aligned, the rotational position may be fixed.

After the ferrule body 212 and the alignment sleeve 220 are fixed to one another, the ferrule body 212 may be aligned along the transverse axes with the multi-lens optical component 100 and/or the header subassembly 120. This may be by rotational alignment. Additionally or alternatively, the ferrule assembly 200 that is fixed to the alignment sleeve 220 may be rotated to rotationally align the ferrule body 212 with the multi-lens optical component 100 and/or the header subassembly 120. For example, if the optical fibers 202 include a linear configuration as illustrated or other suitable configuration (e.g., square array), the ferrule body 212 with the alignment sleeve 220 that are fixed in the longitudinal direction may be rotated with respect to the multi-lens optical component 100 to align the optical fibers 202 with corresponding linear configurations of the multi-lens optical component 100 and/or the header subassembly 120.

As illustrated, for example, in FIG. 5B, the sleeve bottom 218 may interface with the housing top 116 at the lower sleeve flange 226. The lower sleeve flange 226 may contribute to preventing the alignment sleeve 220 and the ferrule body 212 from tilting with respect to the multi-lens optical component 100. The lower sleeve flange 226 may also prevent the ferrule body 212 from moving in the longitudinal direction with respect to the multi-lens optical component 100. However, the lower sleeve flange 226 may permit the alignment sleeve 220 and the ferrule body 212 to be repositioned along the axes transverse to the longitudinal axis and/or to be rotated with respect to the multi-lens optical component 100. This may permit the ferrule assembly 200 to be aligned the multi-lens optical component 100 and/or the header subassembly 120.

In one example, the ferrule assembly 200 including the alignment sleeve 220 may be configured to be repositioned along the axes transverse to the longitudinal axis and rotated until each of the optical signals travelling between the optical fibers 202, the multi-lens optical component 100, and/or the header subassembly 120 are aligned. The alignment sleeve 220 may then be fixed to the multi-lens optical component 100. For example, the alignment sleeve 220 may be fixed to the multi-lens optical component 100 by soldering, welding, laser welding, fusing, adhesive, mechanical fastening or any other suitable technique.

Although the figures illustrate examples incorporating one type of connector, the disclosed principles may be applied to other optical connector types now known or used in the future. This may include, but is not limited to, LC, ST, SC, and FC varieties, and other cross-sectional shapes or types of connectors. In some aspects, the type of connector used may dictate its dimensions, size and configuration, and its general shape (e.g., circular, square, rectangular, etc.).

With reference to FIGS. 4A-4B, 5A-5B and 6A-6B, a method of assembling the optoelectronic subassembly 148 will be described in further detail. Although the method will be described with reference to the figures, aspects of the described method may be applied to other structures similar or substantially different from the illustrated figures. The method may include aligning the ferrule assembly 200, the multi-lens optical component 100 and/or the header subassembly 120 with respect to one another. The method may include engaging the ferrule body 212, the alignment sleeve 220 and/or the multi-lens optical component 100 to facilitate aligning. The method may include fixing the ferrule body 212, the alignment sleeve 220, the multi-lens optical component 100, and/or the header subassembly 120 with respect to one another. These and other aspects will be described in further detail below.

The method may include aligning the header subassembly 120 and the multi-lens optical component 100 with respect to one another. The header subassembly 120 and the multi-lens optical component 100 alignment may include moving the multi-lens optical component 100 in any one or more directions and/or rotating the multi-lens optical component 100 with respect to the header subassembly 120 (or vice versa). Alignment may include physically and/or optically aligning the header subassembly 120 and the multi-lens optical component 100 with respect to one another.

Physical alignment may include positioning the multi-lens optical component 100 to a substantially centered position on or over the header subassembly 120 (within acceptable margins which may depend on alignment or manufacturing requirements). Physical alignment may include positioning the multi-lens optical component 100 such that the housing flange 114 does not extend over one or more edges of the header subassembly 120. In some aspects, physical alignment may include positioning the multi-lens optical component 100 such that the flange base 108 and/or the housing flange 114 interface with the header subassembly 120. In other aspects, physical alignment may include positioning the multi-lens optical component 100 such that the flange base 108 and/or the housing flange 114 are spaced apart from the header subassembly 120. Such a spaced apart positioning may permit the multi-lens optical component 100 to be further repositioned to be optically aligned. Additionally or alternatively, the spaced apart positioning may permit an adhesive, seal, solder or other material to be inserted between the multi-lens optical component 100 and the header subassembly 120 to couple them to one another and/or to contribute to providing a hermetic seal between the multi-lens optical component 100 and the header subassembly 120.

Optical alignment may include positioning the multi-lens optical component 100 such that it permits optical signals to travel through the multi-lens optical component 100 to and/or from the header subassembly 120. Specifically, optical alignment may include positioning the multi-lens optical component 100 such that it permits optical signals to travel between at least one of the optoelectronic components 122 such as a multi-channel receiver array, a multi-channel transmitter array, a lens or lens array, and/or any other suitable component; and the optical fibers 202, the optical component 126 and/or any other suitable components.

Optical alignment may include transmitting optical signals through the multi-lens optical component 100 and determining whether the multi-lens optical component 100 is aligned and/or determining a direction to move the multi-lens optical component 100 to align it. Optical alignment may include positioning the multi-lens optical component 100 such that at least one of the lenses 103 of the lens array 104 focuses optical signals traveling through the multi-lens optical component 100. The optical signals may be focused with respect to one or more of: a specified portion of the header subassembly 120, the optoelectronic components 122, the ferrule assembly 200, the optical fibers 202, the optical component 126 and/or any other suitable components. Optical alignment may further include positioning the multi-lens optical component 100 such that all of the lenses 103 of the lens array 104 focus channels of optical signals traveling through the multi-lens optical component 100 between the optical fibers 202 and the header subassembly 120.

The method may include fixing the header subassembly 120 and the multi-lens optical component 100 with respect to one another after they have been optically and/or physically aligned. Fixing may be accomplished by soldering, fusing, welding, laser welding, adhering, mechanical fastening or any suitable technique. In some circumstances, soldering or laser welding may contribute to cost-effective production. Fixing the header subassembly 120 and the multi-lens optical component 100 to one another may contribute to providing a hermetic seal between the multi-lens optical component 100 and the header subassembly 120 to protect portions of the header subassembly 120 and/or the multi-lens optical component 100. In aspects that contribute to providing a hermetic seal, fixing the header subassembly 120 and the multi-lens optical component 100 to one another may be referred to as hermetically sealing the header subassembly 120 with the multi-lens optical component 100.

The method may include engaging the ferrule assembly. For example, the ferrule body 212, the alignment sleeve 220, the multi-lens optical component 100 and/or the header subassembly 120 may be engaged with one another (or vice versa). In some aspects, engaging the alignment sleeve 220 and the ferrule body 212 may facilitate aligning and/or fixing the ferrule assembly 200 with respect to the multi-lens optical component 100 and/or the header subassembly 120. Engaging may include positioning the ferrule body 212 at least partially inside of the alignment sleeve 220 through the sleeve cavity 222. In such positions the ferrule body 212 and/or the alignment sleeve 220 may be considered to be in an engaged position. In the engaged position, the ferrule body 212 may move inward and outward (e.g., longitudinally) with respect to the alignment sleeve 220. In the engaged position the ferrule body 212 may interface with the inside of the alignment sleeve 220 such that the freedom of movement of the ferrule body 212 is restricted in some directions.

Engaging may further include positioning the ferrule assembly 200, and including the alignment sleeve 220 and the ferrule body 212 being in the engaged position toward the multi-lens optical component 100. The alignment sleeve 220 and/or the ferrule assembly 200 may be positioned such that they may be further repositioned to be optically aligned. In some aspects, engaging may include positioning the alignment sleeve 220 such that the sleeve bottom 218 and/or the lower sleeve flange 226 interface with the housing top 116 of the multi-lens optical component 100. In other aspects, engaging may include positioning the alignment sleeve 220 such that the sleeve bottom 218 and/or the lower sleeve flange 226 are spaced apart from the housing top 116 of the multi-lens optical component 100. The spaced apart positioning may permit an adhesive, seal, solder or other material to be inserted between the multi-lens optical component 100 and the alignment sleeve 220 to couple them to one another and/or to contribute to providing a seal (hermetic or otherwise) between the multi-lens optical component 100 and the alignment sleeve 220.

The method may include longitudinally aligning the ferrule assembly 200 with respect to the multi-lens optical component 100 and/or the header subassembly 120 in the longitudinal direction. Longitudinally alignment may include transmitting optical signals between the optical fibers 202 and either: the multi-lens optical component 100, the header subassembly 120 or both. Longitudinally alignment may include determining whether the ferrule assembly 200 is aligned and/or determining a direction to move the ferrule body 212 to align the ferrule assembly 200. Longitudinally alignment may include positioning the ferrule body 212 with respect to the multi-lens optical component 100, and/or the header subassembly 120 such that at least one channel of optical signals travels to and/or from at least one of the optical fibers 202. Longitudinally alignment may include focusing the at least one channel of optical signals by repositioning the ferrule body 212 along a longitudinal axis with respect to the alignment sleeve 220, the multi-lens optical component 100 and/or the header subassembly 120. In one aspect, the ferrule body 212 is longitudinally positioned within the alignment sleeve 220 so that the alignment sleeve 220 may be laterally or rotationally manipulated with respect to the multi-lens optical component 100 and/or the header subassembly 120.

The method may include fixing the ferrule body 212 and the alignment sleeve 220 with respect to one another after the ferrule assembly 200 has been longitudinally aligned. That is, when in the longitudinal position, the ferrule body 212 may be fixed to the alignment sleeve 220. Fixing may be accomplished by soldering, fusing, welding, laser welding, adhering, mechanical fastening or any suitable technique. In some circumstances, soldering or laser welding may contribute to cost-effective production. Fixing the ferrule body 212 and the alignment sleeve 220 to one another may facilitate aligning the ferrule assembly 200 by restricting the movement of the ferrule body 212, for example, in the longitudinal direction.

The method may include optically aligning the ferrule assembly 200 with respect to the multi-lens optical component 100 and/or the header subassembly 120. The ferrule assembly 200 optical alignment may include transmitting optical signals between the optical fibers 202 and either the multi-lens optical component 100, the header subassembly 120 or both. The ferrule assembly 200 optical alignment may include determining whether the ferrule assembly 200 is optically aligned and/or determining a lateral or rotational direction to move the ferrule assembly 200 to obtain optical alignment. The ferrule assembly 200 optical alignment may include positioning the ferrule assembly 200 with respect to the multi-lens optical component 100 and/or the header subassembly 120 to optically align the ferrule assembly 200 such that optical signals may travel between at least one of the optical fibers 202, a corresponding one of the lenses 103 of the lens array 104, and/or a specified portion of the header subassembly 120. The ferrule assembly 200 positioning may include moving the ferrule assembly 200 along axes transverse to the longitudinal axis. The ferrule assembly 200 optical alignment may include rotating the ferrule assembly 200 (that may be fixed to the alignment sleeve 220) to rotationally align the ferrule assembly 200 with respect to the multi-lens optical component 100 and/or the header subassembly 120. For example, the ferrule assembly 200 may be rotated such that the linear configuration of the optical fibers 202 corresponds to the linear configuration of the lens array 104 and/or a linear configuration of one of the optoelectronic components 122 such as a multi-channel receiver array, a multi-channel transmitter array, a lens, lens array, and/or any other suitable component.

The method may include fixing the alignment sleeve 220 and the multi-lens optical component 100 with respect to one another after the ferrule assembly 200 optically aligning. Fixing may be accomplished by soldering, fusing, welding, laser welding, adhering, mechanical fastening or any suitable technique. In some circumstances, soldering or laser welding may contribute to cost-effective production.

In some aspects, the method may include fixing the second optical component 126 to the ferrule assembly 200 and/or the multi-lens optical component 100. Fixing may be accomplished by soldering, fusing, welding, laser welding, adhering, mechanical fastening or any suitable technique. In circumstances where aligning the second optical component 126 is beneficial or required, the method may include aligning the second optical component 126 before it is fixed. The optical component 126 alignment may include moving the second optical component 126 in any one or more directions and/or rotating the second optical component 126. The second optical component 126 may be optically aligned with any one or more of the optical fibers 202, the lens array 104, the lens 128, the header subassembly 120, one or more of the optoelectronic components 122 or any other suitable components. Additionally or alternatively, the second optical component 126 may be physically aligned with any one or more of the front end 228, the housing top 116, the aperture 112 or any other suitable components.

In some configurations, a ferrule alignment assembly may include: a ferrule assembly that may include optical fibers, an upper clamp member and a lower clamp member configured to retain the optical fibers that are positioned between the upper and lower clamp members, and a ferrule body surrounding at least a portion of the upper and lower clamp members; and an alignment sleeve with a sleeve cavity configured to receive the ferrule body such that the ferrule assembly is capable of being longitudinally repositioned with respect to the alignment sleeve.

In some configurations of the ferrule alignment assembly, the upper clamp member, the lower clamp member and the ferrule body may be a single integrally formed member. In some configurations of the ferrule alignment assembly, the upper clamp member and the lower clamp member may be a single integrally formed clamp member. In some configurations of the ferrule alignment assembly, the ferrule body may hold the upper and lower clamp members together to retain the optical fibers. In some configurations, the ferrule alignment assembly may include a potting material positioned within the ferrule body and around the upper and lower clamp members to hold the ferrule assembly together.

In some configurations of the ferrule alignment assembly, the ferrule body may be cylindrical and the upper and lower clamp members may be shaped and sized to fit within the ferrule body. In some configurations of the ferrule alignment assembly, the alignment sleeve may be cylindrical and the sleeve cavity may include a diameter corresponding to a diameter of the ferrule body.

In some configurations of the ferrule alignment assembly, at least one of the upper clamp member or the lower clamp member may be formed of a glass or plastic polymer. In some configurations of the ferrule alignment assembly, the upper clamp member and the lower clamp member may be formed by molding, machining, stamping or printing.

In some configurations of the ferrule alignment assembly, the alignment sleeve may be fixed to the ferrule body. In some configurations of the ferrule alignment assembly, the ferrule body may be soldered, welded, laser welded, fused, adhered or mechanically fastened to the alignment sleeve. In some configurations of the ferrule alignment assembly, the alignment sleeve may include an upper sleeve flange positioned on a sleeve top. In some configurations of the ferrule alignment assembly, the alignment sleeve may include a lower sleeve flange positioned on a sleeve bottom. In some configurations of the ferrule alignment assembly, the alignment sleeve may be fixed to an optical component optically aligned with the ferrule assembly. In some configurations of the ferrule alignment assembly, the alignment sleeve may be soldered, welded, laser welded, fused, adhered or mechanically fastened to the optical component.

In some configurations of the ferrule alignment assembly, the ferrule body may be cylindrical, the alignment sleeve may be cylindrical, and the ferrule body may be rotated with respect to the alignment sleeve when positioned at least partially within the alignment sleeve. In some configurations of the ferrule alignment assembly, the ferrule body may be at least partially restricted from moving in directions transverse to a longitudinal direction with respect to the alignment sleeve when positioned at least partially within the alignment sleeve.

In some configurations, the ferrule alignment assembly may include troughs positioned on either one or both of the upper and lower clamp members. In some configurations of the ferrule alignment assembly, the troughs may contain at least a portion of the optical fibers. In some configurations of the ferrule alignment assembly, the troughs may extend in a longitudinal direction relative to the alignment sleeve. In some configurations of the ferrule alignment assembly, the troughs may be v-shaped, u-shaped, c-shaped, semi-circular, square or tapered. In some configurations of the ferrule alignment assembly, the troughs may be shaped and dimensioned to receive a portion of a corresponding one of the optical fibers. In some configurations of the ferrule alignment assembly, the troughs may be configured to retain the optical fibers in a parallel configuration. In some configurations of the ferrule alignment assembly, the troughs may be configured to retain the optical fibers in a square, rectangular or circular configuration.

In some aspects, a method of assembling an optoelectronic subassembly includes: providing an alignment sleeve having a sleeve cavity and a ferrule body having upper and lower clamp members that retain optical fibers; positioning the ferrule body at least partially inside of the sleeve cavity such that the ferrule body is capable of being repositioned along a longitudinal axis of the alignment sleeve; positioning the alignment sleeve on an optical device including a header assembly and one or more optoelectronic components configured to transmit and/or receive optical signals; aligning the ferrule body inside the sleeve cavity with respect to the optoelectronic component to optically couple the optoelectronic component and at least one of the optical fibers; fixing the ferrule body to the alignment sleeve at a longitudinal position to form a ferrule assembly having the alignment sleeve containing the ferrule body; positioning the ferrule assembly so that the optical fibers are optically coupled with the optoelectronic component; and fixing the ferrule assembly to the optical device to retain optical coupling between the optical fibers and the optoelectronic component.

In some aspects of the method, the aligning may include longitudinal and/or lateral and/or rotational aligning the at least one optical fiber and the optoelectronic component. In some aspects of the method, the aligning may include moving the ferrule assembly along axes transverse to the longitudinal axis to optically couple the optical fibers to the optoelectronic component. In some aspects of the method, the aligning may include rotating the ferrule assembly to optically couple the optical fibers with the optoelectronic component.

In some aspects the method may include transmitting the optical signals between at least one of the optical fibers and the optoelectronic component. In some aspects the method may include determining whether the optical fibers of the ferrule assembly are optically aligned with the optoelectronic component. In some aspects the method may include determining a longitudinal, lateral, or rotational direction to move the aligning sleeve to optically align at least one of the optical fibers with the optoelectronic component.

In some aspects the method may include positioning an optical component between the header subassembly and the ferrule assembly, the optical component may be capable of directing and/or focusing the optical signals traveling between the optoelectronic component and the at least one of the optical fibers. In some aspects the method may include transmitting the optical signals between the at least one of the optical fibers, the optical component and the header subassembly. In some aspects the method may include determining whether the ferrule assembly is aligned with the optical component and the header subassembly. In some aspects the method may include determining a direction to move the ferrule body to align the ferrule assembly with the optical component and the header subassembly. In some aspects the method may include positioning the alignment sleeve such that the alignment sleeve interfaces with the optical component. In some aspects the method may include positioning the alignment sleeve such that the ferrule assembly is optically aligned with the optical component and the header subassembly.

In some aspects the method may include aligning the header subassembly and an optical component with respect to one another, the optical component may be configured to direct and/or focus optical signals traveling between the optoelectronic component and the at least one of the optical fibers. In some aspects the method may include positioning the optical component such that a housing flange of the optical component interfaces with the header subassembly. In some aspects the method may include positioning the optical component such that a housing flange of the optical component is spaced apart from the header subassembly. In some aspects the method may include positioning the optical component to a centered position on or over the header subassembly and such that a housing flange of the optical component does not extend over one or more edges of the header subassembly.

In some aspects the method may include positioning the optical component such that it permits the optical signals to travel to or from the header subassembly. In some aspects the method may include transmitting the optical signals through the optical component. In some aspects the method may include determining whether the optical component is aligned with the header subassembly. In some aspects the method may include determining a direction to move the optical component to align the optical component with the header subassembly. In some aspects the method may include positioning the optical component such that at least one lens of a lens array of the optical component focuses the optical signals traveling through the optical component. In some aspects the method may include positioning the optical component such that all lenses of the lens array focus channels of the optical signals traveling through the optical component between the optical fibers and the header subassembly.

In some aspects the method may include comprising fixing the header subassembly and the optical component after alignment to form the optical device. In some aspects of the method, the optical component may be configured to hermetically seal portions of the header subassembly including the optoelectronic component. In some aspects of the method, fixing the header subassembly and the optical component may include soldering, fusing, welding, laser welding, adhering, or mechanical fastening. In some aspects of the method, fixing the header subassembly and the optical component may include soldering or laser welding. In some aspects the method may include hermetically sealing the header subassembly with the optical component.

In some aspects of the method, fixing the ferrule body to the alignment sleeve may include soldering, fusing, welding, laser welding, adhering, or mechanical fastening. In some aspects of the method, fixing the ferrule body to the alignment sleeve may include soldering or laser welding. In some aspects of the method, fixing the ferrule assembly to the optical device may include soldering, fusing, welding, laser welding, adhering, or mechanical fastening. In some aspects of the method, fixing the ferrule assembly to the optical device may include soldering or laser welding.

In other aspects, a method of assembling an optoelectronic subassembly may include: inserting a ferrule body into a sleeve cavity of an alignment sleeve, the ferrule body including optical fibers, an upper clamp member, and a lower clamp member configured to retain the optical fibers that are positioned between the upper and lower clamp members; and fixing the ferrule body with respect to the alignment sleeve in a longitudinal position in the sleeve cavity to form a ferrule assembly.

In some aspects the method may include repositioning the ferrule body along a longitudinal axis with respect to the alignment sleeve before the fixing. In some aspects the method may include aligning the ferrule assembly with an optical component and a header subassembly, the header subassembly may include one or more optoelectronic components configured to transmit and/or receive optical signals, and the optical component may permit optical signals to travel to and/or from the header subassembly. In some aspects the method may include positioning the ferrule assembly with respect to the optical component or the header subassembly to optically align the ferrule assembly. In some aspects the method may include positioning the ferrule assembly with respect to the optical component and the header subassembly such that at least one channel of the optical signals travels to or from at least one of the optical fibers. In some aspects the method may include moving the ferrule assembly along axes transverse to a longitudinal axis. In some aspects the method may include rotating the ferrule assembly to rotationally align the ferrule assembly with respect to the optical component or the header subassembly.

In some aspects the method may include transmitting the optical signals between the optical fibers and the optical component and the header subassembly. In some aspects the method may include determining whether the ferrule assembly is optically aligned with the header subassembly. In some aspects the method may include determining a direction to move the ferrule assembly to optically align the ferrule assembly.

In some aspects the method may include positioning the alignment sleeve such that the alignment sleeve interfaces the optical component. In some aspects the method may include positioning the alignment sleeve such that the alignment sleeve is spaced apart from the optical component. In some aspects the method may include aligning the header subassembly and the optical component with respect to one another. In some aspects the method may include positioning the optical component such that a housing flange of the optical component interfaces with the header subassembly. In some aspects the method may include positioning the optical component such that a housing flange of the optical component is spaced apart from the header subassembly. In some aspects the method may include positioning the optical component to a centered position on or over the header subassembly and such that a housing flange of the optical component does not extend over one or more edges of the header subassembly.

In some aspects the method may include positioning the optical component such that it permits the optical signals to travel to or from the header subassembly. In some aspects the method may include transmitting the optical signals through the optical component. In some aspects the method may include positioning the optical component such that at least one lens of a lens array of the optical component is capable of focusing the optical signals traveling through the optical component.

In some aspects the method may include fixing the header subassembly and the optical component by soldering, fusing, welding, laser welding, adhering, or mechanical fastening. In some aspects the method may include fixing the header subassembly and the optical component by soldering or laser welding. In some aspects the method may include hermetically sealing the header subassembly with the optical component. In some aspects the method may include fixing the ferrule body and the alignment sleeve by soldering, fusing, welding, laser welding, adhering, or mechanical fastening. In some aspects the method may include fixing the ferrule body and the alignment sleeve by soldering or laser welding.

In some configurations, a ferrule alignment assembly may include one or more of: an upper clamp member and a lower clamp member configured to retain optical fibers positioned between the upper and lower clamp members; troughs positioned on either one or both of the upper and lower clamp members (the troughs may be shaped and dimensioned to receive a portion of a corresponding one of the optical fibers); a ferrule body surrounding at least a portion of the upper and lower clamp members; a potting material positioned within the ferrule body and around the upper and lower clamp members; optical fibers retained between the upper and lower clamp members, at least one of the optical fibers configured to transmit a corresponding set of one or more optical signals through a fiber optic network; a casing surrounding at least a portion of the optical fibers and configured to guard the optical fibers; and an alignment sleeve including a sleeve cavity shaped and dimensioned to receive the ferrule body such that the ferrule body is capable of being longitudinally positioned with respect to the alignment sleeve.

In some configurations of the ferrule alignment assembly, the upper clamp member and the lower clamp member may be formed of a glass or plastic polymer. In some configurations of the ferrule alignment assembly, the upper clamp member and the lower clamp member may be formed by molding, machining, stamping or printing.

In some configurations of the ferrule alignment assembly, the upper clamp member and the lower clamp member may be a single integrally formed clamp member. In some configurations of the ferrule alignment assembly, the lower clamp member and the ferrule body may be a single integrally formed member. In some configurations of the ferrule alignment assembly, the ferrule body may hold the upper and lower clamp members together to retain the optical fibers. In some configurations of the ferrule alignment assembly, the upper and lower clamp members and the potting material may hold the ferrule assembly together. In some configurations of the ferrule alignment assembly, all of the ferrule body, the upper and lower clamp members, and the potting material may contribute to retaining the optical fibers.

In some configurations of the ferrule alignment assembly, the ferrule body may be cylindrical and the upper and lower clamp members may be shaped and sized to fit within the ferrule body. In some configurations of the ferrule alignment assembly, the alignment sleeve may be cylindrical and the sleeve cavity may include a diameter corresponding to a diameter of the ferrule body. In some configurations of the ferrule alignment assembly, the troughs are v-shaped, u-shaped, c-shaped, semi-circular, square or tapered. In some configurations of the ferrule alignment assembly, at least one of the upper clamp member and the lower clamp member may be formed of glass or plastic polymer.

In some configurations of the ferrule alignment assembly, the alignment sleeve may be fixed to the ferrule body that is optically aligned with another component. In some configurations of the ferrule alignment assembly, the ferrule body may be soldered, welded, laser welded, fused, adhered or mechanically fastened to the alignment sleeve.

In some configurations of the ferrule alignment assembly, the alignment sleeve may include an upper sleeve flange positioned on a sleeve top. In some configurations of the ferrule alignment assembly, the alignment sleeve may include a lower sleeve flange positioned on a sleeve bottom. In some configurations of the ferrule alignment assembly, the alignment sleeve may be shaped and dimensioned to interface with an optical component.

In some configurations of the ferrule alignment assembly, the alignment sleeve may be fixed to an optical component optically aligned with the ferrule assembly. In some configurations of the ferrule alignment assembly, the alignment sleeve may be soldered, welded, laser welded, fused, adhered or mechanically fastened to the optical component.

In some configurations of the ferrule alignment assembly, the ferrule body may be cylindrical, the alignment sleeve may be cylindrical, and the ferrule body may be rotated with respect to the alignment sleeve when positioned at least partially within the alignment sleeve. In some configurations of the ferrule alignment assembly, the ferrule body may be at least partially restricted from moving in directions transverse to a longitudinal direction when positioned at least partially within the alignment sleeve.

In yet other aspects, a method of assembling an optoelectronic subassembly may include any of: aligning a multi-channel header subassembly and an optical component with respect to one another, the header subassembly may be configured to transmit and/or receive optical signals, and the optical component may be configured to permit optical signals to travel to and/or from the header subassembly (the optical component may be further configured to hermetically seal portions of the header subassembly including optoelectronic components); positioning the optical component such that a housing flange of the optical component interfaces with the header subassembly; or positioning the optical component such that the housing flange is spaced apart from the header subassembly The method may include positioning the optical component to a centered position on or over the header subassembly and such that a housing flange of the optical component does not extend over one or more edges of the header subassembly; positioning the optical component such that it permits optical signals to travel to and/or from the header subassembly; transmitting optical signals through the optical component; and determining whether the optical component is aligned; determining a direction to move the optical component to align the optical component; positioning the optical component such that at least one lens of a lens array of the optical component capable of focusing the optical signals traveling through the optical component; positioning the optical component such that all of the lenses of the lens array focus channels of optical signals traveling through the optical component between optical fibers and the header subassembly; and/or fixing the header subassembly and the optical component with respect to one another after alignment.

The method may include engaging a ferrule assembly including an alignment sleeve and a ferrule body at least partially surrounding upper and lower clamp members and retaining the optical fibers; and/or positioning the ferrule body at least partially inside of the alignment sleeve through a sleeve cavity such that the ferrule body is capable of being repositioned along a longitudinal axis with respect to the alignment sleeve. The method may include positioning the alignment sleeve such that the alignment sleeve interfaces the optical component; or positioning the alignment sleeve such that the alignment sleeve is spaced apart from the optical component.

The method may include longitudinally aligning the ferrule assembly with respect to the optical component and the header subassembly; and transmitting optical signals between the optical fibers and at least one of the optical component and the header subassembly; determining whether the ferrule assembly is aligned; and determining a direction to move the ferrule body to align the ferrule assembly; positioning the ferrule body with respect to the optical component and the header subassembly such that at least one channel of optical signals travels to or from at least one of the optical fibers; focusing the at least one channel of optical signals by repositioning the ferrule body along a longitudinal axis with respect to the alignment sleeve; and/or fixing the ferrule body and the alignment sleeve with respect to one another after the ferrule assembly has been longitudinally aligned.

The method may include optically aligning the ferrule assembly with respect to the optical component or the header subassembly; transmitting optical signals between the optical fibers and at least one of the optical component and the header subassembly; determining whether the ferrule assembly is optically aligned; and determining a direction to move the ferrule body to optically align the ferrule assembly; positioning the ferrule assembly with respect to the optical component or the header subassembly to optically align the ferrule assembly; moving the ferrule assembly along axes transverse to the longitudinal axis; and rotating the ferrule assembly to rotationally align the ferrule assembly with respect to the optical component or the header subassembly; and/or fixing the alignment sleeve and the optical component with respect to one another after the ferrule assembly optically aligning.

In some aspects of the method, fixing the header subassembly and the optical component with respect to one another may include soldering, fusing, welding, laser welding, adhering, or mechanical fastening. In some aspects of the method, fixing the header subassembly and the optical component with respect to one another may include soldering or laser welding. In some aspects of the method, fixing the header subassembly and the optical component with respect to one another may include hermetically sealing the header subassembly with the optical component. In some aspects of the method, fixing the ferrule body and the alignment sleeve with respect to one another may include soldering, fusing, welding, laser welding, adhering, or mechanical fastening. In some aspects of the method, fixing the ferrule body and the alignment sleeve with respect to one another may include soldering or laser welding. In some aspects of the method, fixing the alignment sleeve and the optical component with respect to one another may include soldering, fusing, welding, laser welding, adhering, or mechanical fastening. In some aspects of the method, fixing the alignment sleeve and the optical component with respect to one another may include soldering or laser welding.

In some aspects the method may include aligning a second optical component to the ferrule assembly. In some aspects the method may include fixing a second optical component to the ferrule assembly. In some aspects the method may include fixing the second optical component to the ferrule assembly by soldering, fusing, welding, laser welding, adhering, or mechanical fastening. In some aspects the method may include fixing the second optical component to the ferrule assembly by soldering or laser welding.

The present disclosure may be embodied in other specific forms without departing from its spirit or essential characteristics. The described examples are to be considered in all respects illustrative and not restrictive. The scope of this disclosure is indicated by the appended claims rather than by the foregoing description. All changes that come within the meaning and range of equivalency of the claims are to be embraced within their scope.

What is claimed is:

1. A ferrule alignment assembly comprising:
   optical fibers;
   an upper clamp member and a lower clamp member configured to retain the optical fibers that are positioned between the upper and lower clamp members;
   a ferrule body surrounding at least a portion of the upper and lower clamp members; and
   an alignment sleeve including a sleeve cavity configured to receive the ferrule body such that the ferrule body is capable of being longitudinally and rotationally repositioned with respect to the alignment sleeve.

2. The ferrule alignment assembly of claim 1, wherein the ferrule body holds the upper and lower clamp members together to retain the optical fibers.

3. The ferrule alignment assembly of claim 1, further comprising a potting material positioned within the ferrule body and around the upper and lower clamp members to hold the upper and lower clamp members together.

4. The ferrule alignment assembly of claim 1, wherein the ferrule body is cylindrical and the upper and lower clamp members are shaped and sized to fit within the ferrule body, and the alignment sleeve is cylindrical and the sleeve cavity includes a diameter corresponding to a diameter of the ferrule body.

5. The ferrule alignment assembly of claim 1, wherein the alignment sleeve is fixed to the ferrule body.

6. The ferrule alignment assembly of claim 1, wherein the ferrule body is at least partially restricted from moving in directions transverse to a longitudinal direction with respect to the alignment sleeve when positioned at least partially within the alignment sleeve.

7. The ferrule alignment assembly of claim 1, further comprising troughs positioned on either one or both of the upper and lower clamp members, wherein the troughs extend in a longitudinal direction relative to the alignment sleeve and retain at least a portion of the optical fibers in a parallel configuration.

8. A method of assembling an optoelectronic subassembly, comprising:
   providing an alignment sleeve having a sleeve cavity and a ferrule body having upper and lower clamp members that retain optical fibers;
   positioning the ferrule body at least partially inside of the sleeve cavity such that the ferrule body is capable of being repositioned along a longitudinal axis of the alignment sleeve;
   positioning the alignment sleeve on an optical device including a header assembly and one or more optoelectronic components configured to transmit and/or receive optical signals;
   longitudinally and rotationally aligning the ferrule body inside the sleeve cavity with respect to the alignment sleeve and the optoelectronic component to optically couple the optoelectronic component and at least one of the optical fibers;
   fixing the ferrule body to the alignment sleeve at a longitudinal position to form a ferrule assembly having the alignment sleeve containing the ferrule body;
   positioning the ferrule assembly so that the optical fibers are optically coupled with the optoelectronic component; and
   fixing the ferrule assembly to the optical device to retain optical coupling between the optical fibers and the optoelectronic component.

9. The method of claim 8, further comprising transmitting the optical signals between at least one of the optical fibers and the optoelectronic component.

10. The method of claim 9, further comprising determining whether the optical fibers of the ferrule assembly are optically aligned with the optoelectronic component and determining a longitudinal, lateral, or rotational direction to move the aligning sleeve to optically align at least one of the optical fibers with the optoelectronic component.

11. The method of claim 8, further comprising:
   positioning an optical component between the header subassembly and the ferrule assembly, the optical component being capable of directing and/or focusing the optical signals traveling between the optoelectronic component and the at least one of the optical fibers;
   transmitting the optical signals between the at least one of the optical fibers, the optical component and the header subassembly;
   determining whether the ferrule assembly is aligned with the optical component and the header subassembly; and determining a direction to move the ferrule body to align the ferrule assembly with the optical component and the header subassembly when the ferrule assembly is not aligned with the optical component and the header subassembly.

12. The method of claim 11, further comprising positioning the alignment sleeve such that the alignment sleeve interfaces with the optical component and positioning the alignment sleeve such that the ferrule assembly is optically aligned with the optical component and the header subassembly.

13. The method of claim 8, further comprising aligning the header subassembly and an optical component with respect to one another, the optical component configured to direct and/or focus optical signals traveling between the optoelectronic component and the at least one of the optical fibers.

14. The method of claim 13, further comprising:
positioning the optical component such that it permits the optical signals to travel to or from the header subassembly;
transmitting the optical signals through the optical component;
determining whether the optical component is aligned with the header subassembly;
determining a direction to move the optical component to align the optical component with the header subassembly; and
positioning the optical component such that at least one lens of a lens array of the optical component is capable of focusing the optical signals traveling through the optical component.

15. The method of claim 14, further comprising:
positioning the optical component such that all lenses of the lens array focus channels of the optical signals traveling through the optical component between the optical fibers and the header subassembly; and
fixing the header subassembly and the optical component after alignment to form the optical device.

16. A method of assembling an optoelectronic subassembly, comprising:
inserting a ferrule body into a sleeve cavity of an alignment sleeve, the ferrule body comprising:
optical fibers; and
an upper clamp member and a lower clamp member configured to retain the optical fibers that are positioned between the upper and lower clamp members, the ferrule body surrounding at least a portion of the upper and lower clamp members and the ferrule body holding the upper and lower clamp members together to retain the optical fibers;
longitudinally and rotationally repositioning the ferrule body inside the sleeve cavity with respect to the alignment sleeve; and
fixing the ferrule body with respect to the alignment sleeve in a longitudinal position in the sleeve cavity to form a ferrule assembly.

17. The method of claim 16, further comprising aligning the ferrule assembly with an optical component and a header subassembly, the header subassembly having one or more optoelectronic components configured to transmit and/or receive optical signals, and the optical component configured to permit optical signals to travel to and/or from the header subassembly.

18. The method of claim 16, further comprising, prior to the fixing of the ferrule body with respect to the alignment sleeve:
moving the ferrule assembly along axes transverse to the longitudinal axis; and
rotating the ferrule assembly to rotationally align the ferrule assembly with respect to an optical component or a header subassembly.

19. The method of claim 18, further comprising positioning the ferrule assembly with respect to the optical component and the header subassembly such that at least one channel of the optical signals travels to or from at least one of the optical fibers.

* * * * *